Nov. 19, 1963

W. S. RAYNOR 3,111,233

PALLET LOADING MACHINE

Filed Sept. 19, 1958

INVENTOR

Warren S. Raynor

BY
Mead, Browne, Schuyler & Beveridge
ATTORNEYS

Nov. 19, 1963  W. S. RAYNOR  3,111,233
PALLET LOADING MACHINE
Filed Sept. 19, 1958  8 Sheets-Sheet 4

INVENTOR
Warren S. Raynor
BY
ATTORNEYS

Nov. 19, 1963   W. S. RAYNOR   3,111,233
PALLET LOADING MACHINE
Filed Sept. 19, 1958   8 Sheets-Sheet 6

Fig. 6

INVENTOR
Warren S. Raynor
BY
Mead, Browne, Schuyler and Burridge
ATTORNEYS

Nov. 19, 1963

W. S. RAYNOR 3,111,233

PALLET LOADING MACHINE

Filed Sept. 19, 1958

INVENTOR

Warren S. Raynor

BY
Mead, Browne, Schuyler & Beveridge
ATTORNEYS

United States Patent Office 3,111,233
Patented Nov. 19, 1963

3,111,233
PALLET LOADING MACHINE
Warren S. Raynor, Port Hope, Ontario, Canada, assignor to Mathews Conveyer Company, Ellwood City, Pa., a corporation of Pennsylvania
Filed Sept. 19, 1958, Ser. No. 761,993
12 Claims. (Cl. 214—6)

This invention relates to machines for assuming articles from a conveyer line into predetermined arrangements in a unit load and particularly concerns apparatus for aligning and compacting layers of cartons to be moved as a unit by handling devices such as lift trucks.

The present application is a continuation-in-part of my Applications Serial Nos. 469,274 filed November 16, 1954 (now Patent No. 2,946,465), 605,025 filed August 20, 1956 (now Patent No. 2,942,717), and 728,243 filed April 14, 1958.

In ordinary material handling installations articles are discharged from a conveyer line, as for example a packaging machine which has packed cans or bottles into cartons. The cartons are then manually stacked on to a pallet to form a unit load. Each unit load of a stack of articles is handled as a group in subsequent warehousing and shipping operations by lift trucks and other automatic handling equipment.

Machines to replace the manual pallet loading operation and automatically stack articles onto a pallet, have met with varying degrees of success. One of the problems encountered in the development of these machines has been the instability of articles assembled on the pallets. To increase stability of the stacked articles machines have been developed to form alternate layers of cartons into interlocking layers. This permits stacking a greater number of layers and thereby increases the number of articles on each pallet. However, slight misalignments of articles in a layer and undesired separations or spacings between articles in a layer not only distorts the pattern of a particular layer, but partially destroys the interlock with layers above and below. Although misalignments or spacings in any given layer may be small, similar flaws in several layers may result in an unsatisfactory load.

Automatic machines must be set to stack articles only as high as is permissible with the most unstable condition, even though some stacks may be quite sufficiently stable for higher loads.

A major object of the invention is to provide a mechanism for assembling layers of articles into a stable stack on a pallet.

Another object of my invention is to provide a mechanism for assembling articles into a compact layer properly oriented upon a pallet, and to locate layers on top of other layers, similarly oriented and compacted.

A further object of my invention is to provide a mechanism for accurately forming stable stacks of articles of varying sizes handled by the stacking mechanism.

In the attainment of these objects, one feature of the invention resides in the arrangement of guides at the sides of a layer of articles deposited on a pallet and operated to positively engage a side of the layer when it is deposited on the pallet. These guides are disposed beneath an apron on which articles are assembled into a layer and which is retracted to deposit the layer on a pallet, the pallet then being lowered to permit return of the apron and subsequent assembly of another layer. Articles forming the layer stripped from the apron are compacted and aligned by operation of guides to engage the sides of the articles which are thereby compacted into a rectangular layer aligned with preceding and succeeding layers.

Another feature of the invention resides in the automatic operation of the guides synchronized with operation of the pallet lift to move the guides into engagement with the articles when the layer is located at a level within the area of operation of the guides.

Other features, advantages and objects will become evident from the following specification and the accompanying drawings.

In the drawings:

FIG. 8 is a plan view of a pallet loading machine embodying a modified form of the invention with some parts broken away and others removed to show the closing-in guide structure;

General Arrangement

Figure 1:
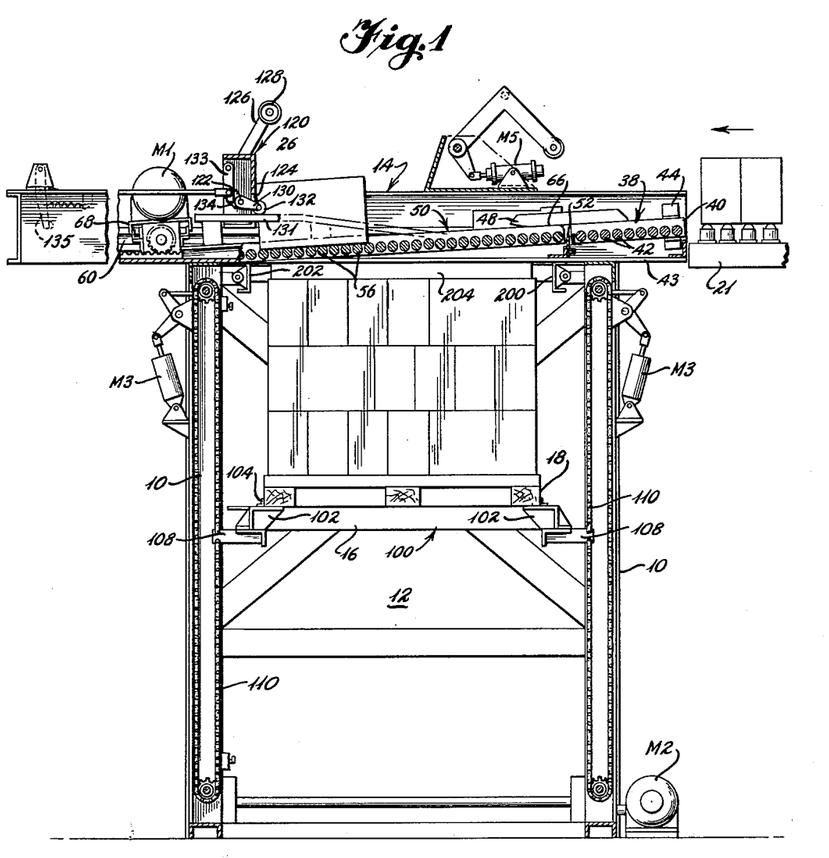
FIG. 1 is a vertical sectional view of a pallet loading machine embodying a preferred form of the invention.
Figure 2:
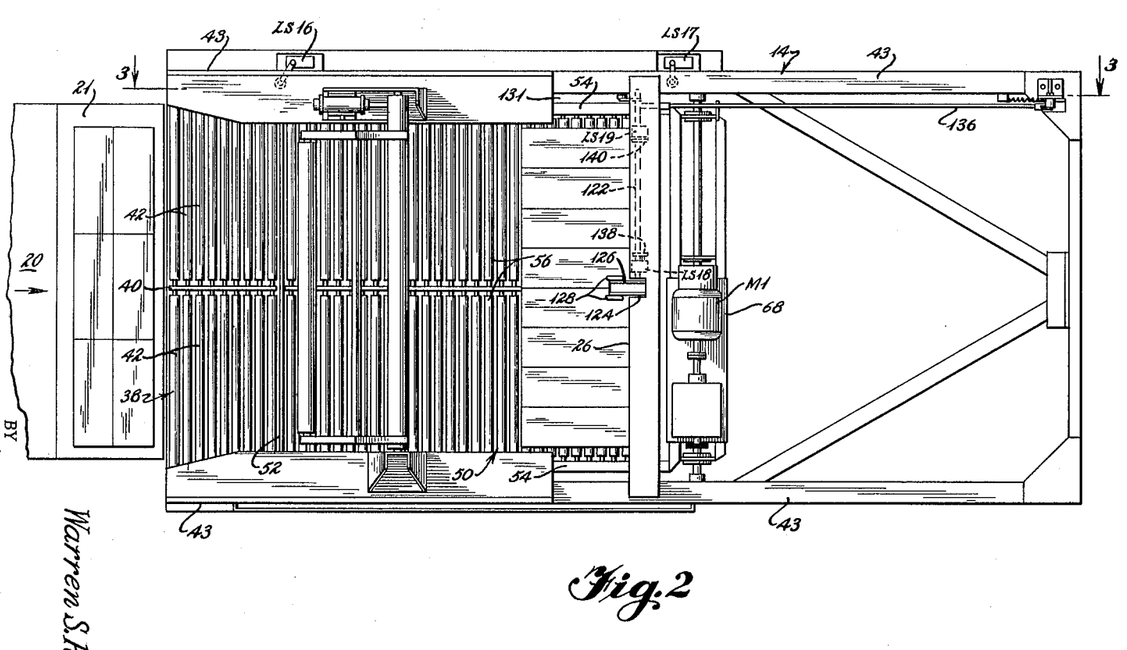
FIG. 2 is a top plan view of the machine of FIG. 1.

As shown in FIGS. 1 and 2 a pallet loading machine has a vertical frame 10 defining a vertically extending shaft 12 at the top of which is a horizontally extending track 14. Frame 10 carries a pallet lift assembly 16 which raises and lowers a pallet 18 within the frame shaft.

Cartons or articles to be loaded upon a pallet are fed into the machine upon an infeed conveyer to a ball transfer table 21 where they may be oriented and arranged in rows by the machine operator.

Groups or rows of articles are moved down the inclined article supporting surface of an apron 50 until they engage a stationary stripper bar 26. Subsequent rows of articles are assembled and transferred to apron assembly 50 until sufficient groups of articles have been accumulated upon apron 50 to form a layer upon the pallet. An operator then energizes the apron drive motor M1 to retract the apron from beneath the articles, allowing the layer of articles to drop on to pallet 18 which is supported immediately beneath the apron by pallet lift 16. The pallet lift is then actuated to automatically lower until the upper surfaces of the articles upon the pallet occupy the position previously occupied by the article supporting surface of the pallet.

Lift 16 is stopped at that position and closing-in guides arranged around the sides of the pallet lift are actuated to align and compact the layer of articles upon the pallet. Apron 50 is automatically returned to its previous position overlying the lift shaft and further layers of articles are transferred to the pallet in a similar manner. Upon the transfer of each layer of articles to the pallet, the pallet lift is automatically lowered step by step. When the pallet is fully loaded, the lift control means operate to lower the lift to the bottom of the pallet lift shaft.

Apron Assembly

Figure 3:
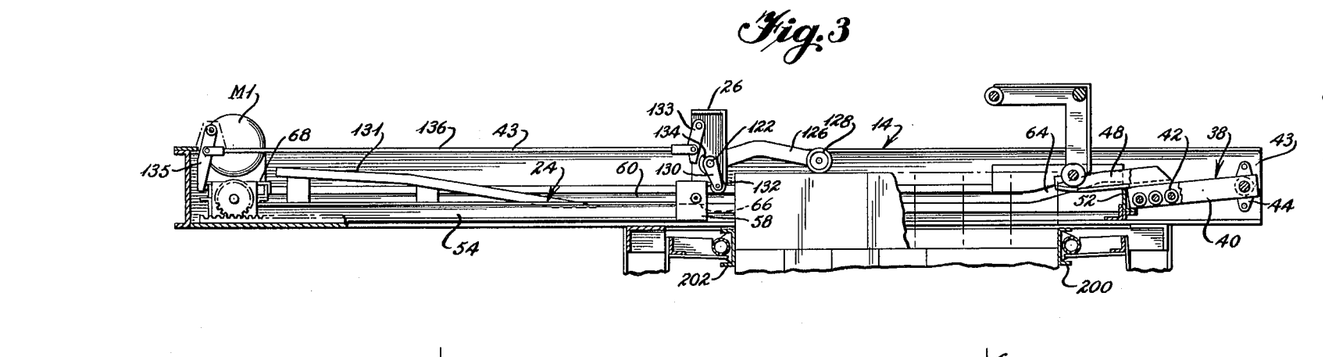
FIG. 3 is a partial sectional view taken on line 3—3 of FIG. 2 disclosing the mechanism for retracting the sliding apron.

The structural details of apron 50 may be best appreciated by reference to FIGS. 1–3. The article supporting surface of apron 50 is normally contiguous to an accumulation table 38 which includes a rigid frame 40 within which are rotatably supported a plurality of elongated rollers 42, defining the article supporting surface of the accumulation table 38. Frame 40 is pivotally supported between spaced side frame members 43 of track 14 by journal assemblies 44 located adjacent the edge of transfer table 21.

A fixed stop plate 52 projects upwardly between side frame members 43 along the rear edge of accumulation table 38. As can be seen in FIG. 1, when the accumulation table 38 is in its upper position, stop 52 is disposed below the article supporting surface defined by rollers 42, thereby permitting passage of articles from table 38 to apron 50. When table 38 is in its lower position shown in FIG. 3, stop member 52 projects above the surface of rollers 42 to prevent articles from passing beyond the accumulation table 38.

Apron 50 includes a rigid frame designated generally at 54 within which are rotatably supported a plurality of rollers 56 which define an article supporting surface. Apron 50 is supported for movement upon side frame members 43 by roller wheel assemblies 58, which ride along fixed track sections 60, mounted on each of side frame members 43. Track sections 60, permit movement of apron 50 from an operating position shown in FIG. 1, where the rollers of the apron are adjacent the roller of the accumulation table 38, to a retracted position shown in FIG. 3 where the apron 50 is retracted beyond fixed stripper bar 26 mounted between side frame members 43 and extending across the article supporting rollers of apron 50.

As best seen in FIG. 3, the forward portion of each track section 60 is provided with an upwardly inclined section 64 which causes the forward edge of apron 50 to be elevated as it approaches accumulation table 38. As apron 50 moves from the retracted position shown in FIG. 3, to the operating position shown in FIG. 1, cam arms 48 projecting from accumulation table 38 are engaged by cam surfaces 66, of apron frame 54 to elevate accumulation table 38 above stop member 46 as shown in FIG. 1.

Apron 50 is driven by a motor M1 on a motor mount 68 attached to the rear edge of apron frame 54. Limit switches LS16 and LS17 mounted upon one of side frame members 43 have strikers which project through the side frame member into track section 60. LS16 is located so that its striker is engaged by front wheel assembly 58 when apron 50 is in its forwardmost operating position (FIG. 1) while LS17 is located so that its striker is engaged by assembly 58 when the apron is its fully retracted position.

Full Pallet Lift

Figure 4:
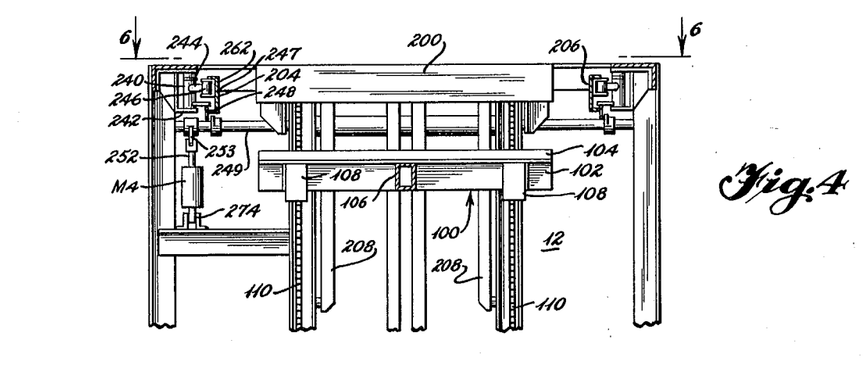
FIG. 4 is a partial vertical sectional view of the machine with parts removed to show closing-in guide structure.
Figure 5:
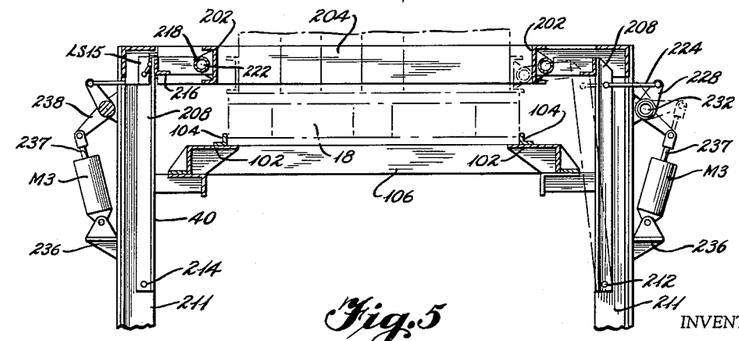
FIG. 5 is a vertical sectional view taken on line 5—5 of FIG. 6.
Figure 6:
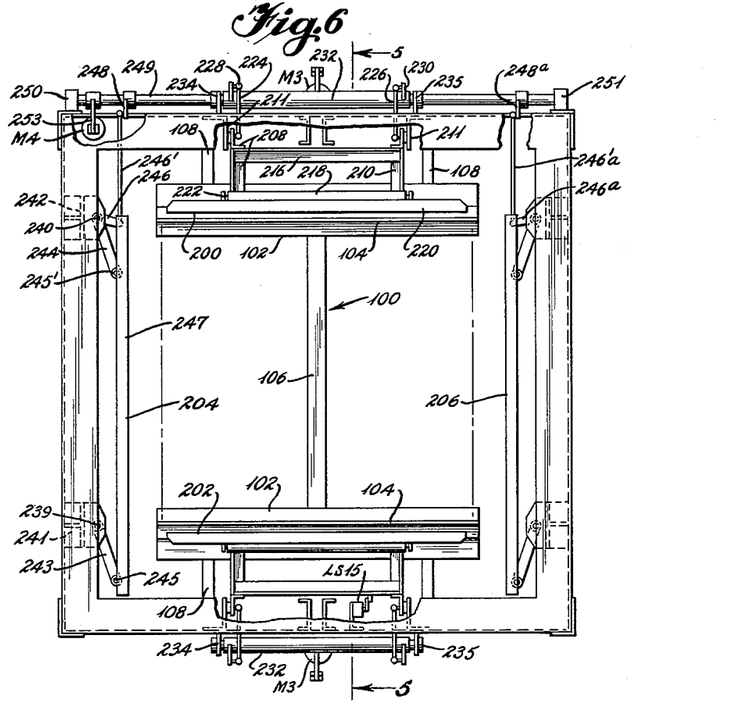
FIG. 6 is a horizontal sectional view taken on line 6—6 of FIG. 4.
Figure 7:
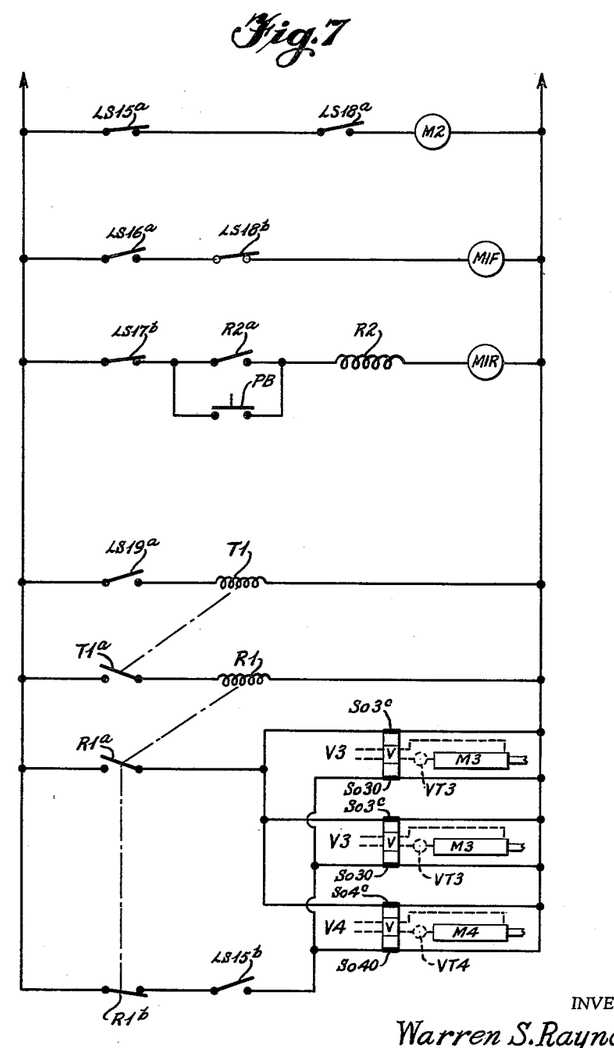
FIG. 7 is a schematic view illustrating the electrical and pneumatic circuit utilized with the pallet loading machine of FIGS. 1–6.

As best seen in FIGS. 1 and 4 to 6, full pallet lift 16 operates within shaft 12 extending downwardly beneath the forwardmost position of movable apron 50. Lift 16 includes a lift platform 100 of generally H-shaped appearance when viewed from above (FIG. 6). The side frame members 102 of the lift platform are of generally angle-shaped configuration and extend entirely across the front and rear sides of the pallet lift shaft. Guide members 104 are secured upon the upper surface of side frame members 102 to locate the pallet 18 on the lift platform. A single rigid cross member 106 interconnects the respective side members 102. At spaced locations on each of side members 102 a coupling assembly 108 connects the lift platform to lift chains 110 which are driven to raise or lower the lift by a reversible lift motor M2 coupled to simultaneously drive each of the four sets of chains 110.

Full Lift Control

The pallet, when waiting receipt of the first layer of articles, is disposed immediately below the apron. Full retraction of the apron is utilized in the full pallet lift control circuit to initiate lowering of the lift. To halt lowering of the lift when the last transferred layer of articles reaches a position where its upper surface occupies the level previously occupied by the pallet (or next previously transferred layer), a full lift control device 120 is mounted upon frame members 26.

As illustrated in FIGS. 1 and 3, a shaft 122 is journaled for rotation about a horizontal axis behind stripper bar 26. Fixed to the central portion of the shaft 122 and extending through an aperture 124 in the stripper bar is a lift control arm 126 carrying article engaging rollers 128. To shift the lift control arm 126 to and from an operative position disposed over the lift, an arm 130 on one end of shaft 122 has a cam roller 132 which engages cam track 131 disposed at one side of the apron frame 54 and movable with the apron. As apron 50 is retracted from its position overlying the shaft, cam track 131 is withdrawn from engagement with roller 132 but control arm 126 is retained in its inoperative position by a pivoted keeper 133 which engages latch 134 on the shaft 122. When the apron is retracted to its rearmost position where its rear edge engages the free end of a latch control arm 135 pivoted to the frame and connected by a rod 136 to the latch keeper 133. As is apparent in FIG. 3, this engagement of apron 50 with latch control arm 135 removes keeper 133 from engagement with latch 134 and releases control arm 126 to drop by gravity until its roller 128 engages the top of a carton on the pallet. In this way rotation of shaft 122 is controlled so it moves a switch operating cam 138 to energize lift motor M2 when the apron is retracted and the lift control latch is released.

Cam 138 is so designed that limit switch LS18 remains in position to energize motor M2 until the level of the cartons on the pallet is lowered to a position immediately beneath the apron 50. Then, the motor is stopped and downward movement of the lift is arrested. As the apron returns to its position overlying the pallet, cam 131 engages follower 132 to rotate lift control arm 126 to its operative position when keeper 133 again engages latch 134. A cam 140 on shaft 122 engages a limit switch LS19 when the apron is fully retracted to initiate action of the closing-in guide assembly.

Closing-in Guide Assembly

A closing-in guide assembly, best shown in FIGS. 4 to 6, is located within the pallet lift shaft immediately below apron 50 to compact articles in position upon the pallet. The closing-in guide assembly includes front and rear closing-in guides 200, 202, respectively, and side closing-in guides 204, 206.

Front and rear closing-in guides 200 and 202 are identical, and the following description of the structure of front closing-in guide 200 is equally applicable to the structure of rear closing-in guide 202. Front closing-in guide 200 includes a pair of horizontally spaced L-shaped side members 208, 210 which are pivotally supported at their lower ends upon uprights 211 of the machine frame by studs 212, 214, respectively. Side members 208 and 210 are rigidly connected at their upper ends by cross members 216 and 218. A carton engaging plate 220 is pivotally supported in front of cross member 218 as by studs 222 which couple plate 220 to cross member 218.

Actuating links 224 and 226 are pivotally connected respectively to side members 208 and 210 adjacent the upper end of the side members to couple the closing-in guide frame to crank arms 228 and 230 which are fixed to a rotatable actuating shaft 232 journaled for rotation upon the machine frame at 234, 235. Shaft 232 is rotated by a reversible pneumatic motor M3 which is pivotally supported at one end upon a bracket 236 on the machine frame. The piston rod 237 of motor M3 is pivotally connected to crank 238 which is fixed to shaft 232.

In FIG. 5, the front and rear closing-in guides are shown in their retracted position. Application of pneumatic pressure to motors M3 moves the piston rods of the respective motors upwardly to drive the closing-in guides to the dotted line position of FIG. 5, thereby compacting the layer of cartons disposed on pallet 18.

Actuation of all closing-in guides is initiated by limit switch LS19 of the full lift drop control assembly. An additional limit switch LS15 is mounted upon the machine frame at a location where its striker may be engaged by front closing-in guide 202 when guide 202 is in its retracted position. LS15 is employed in the closing-in guide retraction control circuit and further serves as a safety interlock to prevent operation of the lift unless all closing-in guides are in their retracted positions.

Side closing-in guides 204 and 206 are identical to each other and the following description of guide 204 is equally applicable to guide 206. Guide 204 is supported upon the machine frame from a pair of spaced vertical pivot pins 239, 240 which are journaled for rotation about vertical axes in ears 241, 242 respectively. Crank arms 243, 244 are respectively fixed to pivot pins 245 and 245' and are pivotally coupled at their outer ends to article engaging pusher plate 247. The foregoing arrangement may be considered a parallel link system wherein plate 247 is maintained in parallel relationship at all times to the "stationary link" defined by the machine frame connection between pivot pins 239 and 240.

An operating crank 246 is rigidly connected to pin 240 and is coupled by a pivoted link member 246' to crank 248 which is fixed to a rotatable operating shaft 249 extending across the rear side of the pallet lift shaft. Shaft 249 is rotatably supported from the machine frame in journal assemblies 250 and 251 and includes, at the opposite side of the lift shaft a similar crank and link connection 248a, 246', 246a for controlling side closing-in guide 206. A single reversible pneumatic motor M4 is employed to rotate shaft 249 to simultaneously actuate both side closing-in guides 204 and 206. Motor M4 is pivotally supported at one end on the machine frame and its piston rod 252 is pivotally connected to crank 253 which is fixed to shaft 249.

In FIG. 6, the side closing-in guides are shown in full line in their retracted position. Actuation of motor M4 from the position of FIG. 4 drives crank 253 upwardly to rotate shaft 249 and draw links 246' and 246'a toward the rear of the machine, thereby rotating links 242 and 243 toward the rear of the machine to move pusher plate 247 to the broken line position of FIG. 6, thereby compressing the cartons located upon the pallet. Side closing-in guide motor M4 is connected to be actuated simultaneously with front and rear closing-in guide motors M3.

Operation

When sufficient articles are placed upon apron 50 to form a layer upon the pallet, the operator actuates a push button PB to actuate retraction control M1R for apron drive motor M1 to retract apron 50. Retraction of the apron from beneath the articles strips the articles, by their engagement with stripper bar 26, from the apron and allows them to drop on to the pallet 18 supported immediately below the apron by the full pallet lift 16. Upon full retraction of the apron, limit switch LS17 is engaged to open contacts LS17b to be de-energize apron retraction control M1R.

Retraction of the apron also releases latch keeper arm 133 for the lift control to permit lift control arm 126 in FIG. 3 to move downwardly so roller 128 engages the top of cartons on the pallet. Striker 138 on shaft 122 then actuates limit switch LS18 to close contacts 18a and energize full pallet lift "motor" M2 to cause the lift to move downward until the level of the cartons deposited on the pallet is immediately beneath the level of the apron whereupon full pallet lift "motor" M2 is de-energized upon opening of LS18a. This also closes contacts LS18b to actuate forward control M1F for apron motor M1 and initiate forward movement of the apron which elevates the lift control arm to its inoperative position.

As control arm 126 follows the articles downwardly LS19 is actuated by striker 140 on shaft 122 to close contacts LS19a and initiate operation of time delay relay T1. After a brief interval of a length sufficient to complete the lowering movement of the full lift, contacts T1a of time delay relay T1 are closed to energize relay R1 and close its contacts R1a to energize solenoids So3C, and So4C of reversible valves V3, and V4 to position the valves so air is supplied to the closing-in guide motors M3, and M4, respectively. Throttle valves VT3, and VT4 in the air lines for the motors are adjusted so the guides engage opposite sides of the layer of articles of the pallet before the corresponding guides engage contiguous sides. When the apron reaches its forwardmost position and strikes limit switch LS15, contacts LS15b are closed to energize reversing solenoids So30, and So40 to shift the valves V3, and V4 and cause air to flow to the return sides of the pneumatic motors and thereby retract the four closing-in guides.

The foregoing cycle of apron operation and step by step lowering of the full pallet lift continues until a full load is stacked upon the pallet within the lift. In this way an accurately aligned and compacted unit load is formed on the pallet. As is apparent, the closing-in guides are operated each time a layer of articles is deposited on the pallet lift. Normally, the guides are retracted at the sides of the shaft in a location immediately beneath the apron so the full lift may move upwardly to a position beneath the apron and receive a first layer of articles. After the layer of articles is deposited on the lift and the lift is moved downwardly, the closing-in guides are moved into the shaft to engage the four sides of the layer of articles to simultaneously align the articles with other layers and compact the layer. In this way the layers of the load are uniformly arranged and compacted on the pallet.

Operation of the closing-in guides is effected when downward movement of the full pallet lift moves the layer of articles into the area defined by the guides. Thus, a predetermined time after the apron is retracted and the lift begins to move downward, the closing-in guides are operated to compact the layer on the lift. During the time of the operation of the closing-in guides the apron is restored to its normal position over the shaft of the lift.

Modified Constructions

Figures 9, 10:
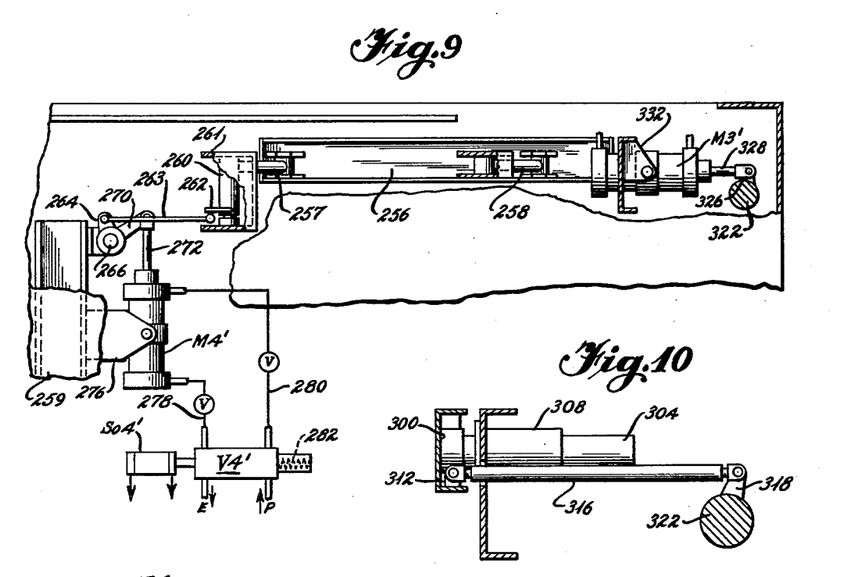
FIG. 9 is a fragmentary sectional view taken on the line 9—9 of FIG. 8.
FIG. 10 is a fragmentary sectional view taken on the line 10—10 of FIG. 8.

One modification of the closing-in guide structure is illustrated in FIGS. 8 to 10 of the drawings.

Referring to FIG. 8, side closing-in guide assemblies 254 and 255 are similar to each other and each includes a carton engaging element 256 pivotally mounted on the outer end of links 257 and 258 which in turn are pivotally supported on frame 259 for rotation in a horizontal plane. The pivotal support for the link 257 takes the form of a vertical shaft 260 (FIG. 9) fixedly secured to the link 257 and journaled for rotation in bracket 261 fixed to frame 259. A crank 262 is mounted upon shaft 260 and is connected by link 263 to a crank 264 fixed upon the respective ends of shaft 266. Shaft 266 is rotatably mounted on frame 259 as at 268 and provides a common connection between the respective side closing-in guide assemblies 254 and 255 for simultaneous actuation thereof. Shaft 266 is rotated by crank 270 fixedly secured to shaft 266 and pivotally connected at its outer end to piston rod 272 of expansible chamber motor M4'. Motor M4' is pivotally supported upon the machine frame as at 276 (FIG. 9) to accommodate for the rotary path of crank 270. The respective sides of the piston of motor M4' are connected by lines 278, 280 to pressure and exhaust lines P and E, respectively, through a four-way reversing valve V4'. Valve V4' is normally biased to a position wherein pressure is admitted to motor M4' through line 278 by spring 282 to drive piston rod 272 to its uppermost position, thereby establishing the normal position of closing-in guides 254 and 255 in their retracted or full line position as shown in FIG. 8. Energization of solenoid coil So4' reverses the connections of reversing valve V4' to cause piston rod 272 to stroke downwardly as viewed in FIG. 9 and thus drive the elements 250 to carton engaging position as shown in broken lines in FIG. 8.

During the retraction of apron 50, the one row of cartons is squared up and aligned by stripper bar 26 so front closing-in guide 286 is sufficient to compact and square up the cartons opposite the stripper bar.

Front closing-in guide assembly 286 includes a carton engaging element 300 having a pair of rearwardly projecting guide rods 302 and 304 which are slidably supported in elongated journal assemblies 306 and 308 mounted on frame 259'. Upstanding lugs 310, 312 form a pivotal support for one end of links 314, 316 which connect carton engaging element 300 to cranks 318, 320 integral with shaft 322 journaled for rotation in frame 259 at 324.

A third crank 326 is secured upon shaft 322 and is pivotally connected to the outer end of a piston rod 328 of expansible chamber motor M3'. Motor M3' is pivotally supported upon the frame 259' as at 332 to compensate for vertical displacement of piston rod 328 occasioned by rotation of crank 326. The respective sides of the piston within motor M3' are connected by lines 334, 336 to pressure and exhaust lines, F and E, respectively, through a four-way reversing valve V3'. Spring 338 is employed to normally establish the connection of valve V3' to connect line 334 to the pressure line F, thereby locating piston rod 328 in its outermost position to retract element 300 into the position shown in FIG. 10. Energization of solenoid coil So3' reverses the connection of valve V3' to cause piston rod 328 to stroke in, thereby rotating shaft 322 clockwise as viewed in FIG. 10 and driving element 300, by links 314 and 316, into engagement with the cartons.

Figure 11:
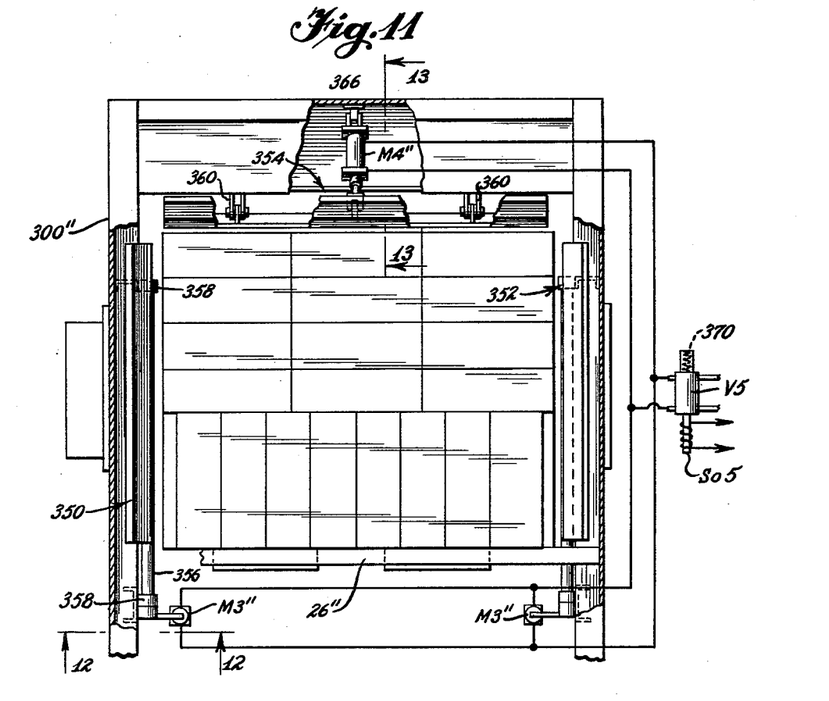
FIG. 11 is a top plan view of the pallet loading machine embodying a further modification of the invention with some parts broken away and others removed to show the closing-in guide structure.
Figure 12:
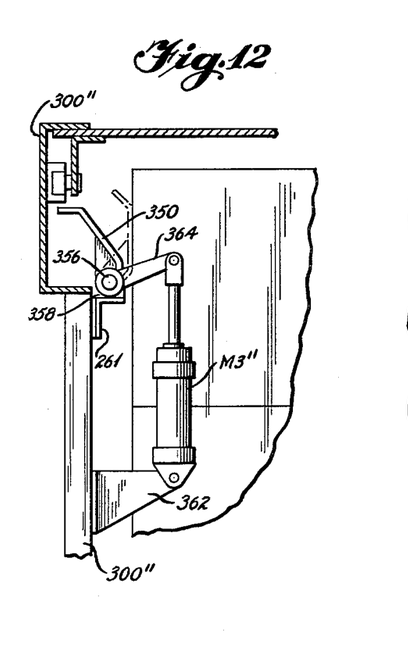
FIG. 12 is a fragmentary sectional view taken on the line 12—12 of FIG. 11.
Figure 13:
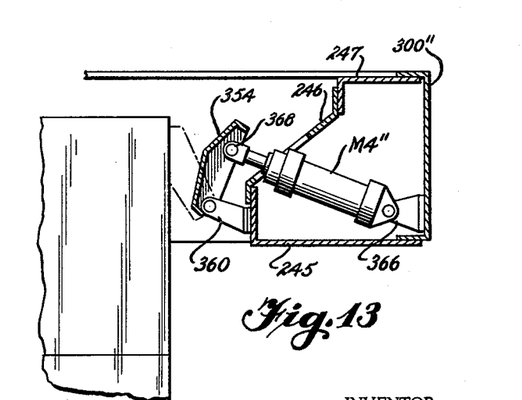
FIG. 13 is a fragmentary sectional view taken on line 13—13 of FIG. 11.

Another modified construction of the closing-in guides is shown in FIGS. 11–13 where two of the guides 350 and 352 are disposed longitudinally of the side edges of the apron; the third guide 354 is disposed adjacent to the end of the apron remote from the stripper bar 26''.

Each of guides 350, 352 is rigidly mounted on a shaft 356 (FIG. 12) journaled in bearings 358 supported by the machine structure. The guide 354 is pivotally mounted on a pair of brackets 360 supported by the machine structure. Separate air cylinders operate the three closing-in guides. Guides 350, 352 are actuated by air cylinders M3'' and guide 354 is actuated by air cylinder M4''. Air cylinder M3'' has one end pivoted on a bracket 362 and its piston rod pivotally connected to an arm 364 rigidly secured to the shaft 356 so reciprocation of the piston and the cylinder M3'' oscillates the closing-in guides 350, 352 from a retracted position as shown in full line in FIG. 12 to a position engaging the sides of cartons dropping onto the full pallet lift as illustrated in dotted lines in FIG. 12. Air cylinder M4'' has its rear end pivotally connected to a bracket 366 on the machine frame and its piston rod pivoted directly to the closing-in guide 354 as at 368 so reciprocation of the piston and cylinder M4'' oscillates the closing-in guide 354 about its pivotal connections to the bracket 360 from a retracted position as shown in full line in FIG. 13 to a carton engaging position as shown in dotted lines in that figure. All of the air cylinders M3'' and M4'' are controlled by a single spring offset, solenoid operated, two position air valve V5 (FIG. 11).

The arrangement is such that normally, the guides are in their operative position as shown in dot and dash lines in FIGS. 12 and 13. When the apron withdraws to drop the pattern onto the pallet, the solenoid of the closing-in guide control valve V5 becomes energized, causing air to flow to the heads of the cylinders M3'' and M4'' and actuating the guides to their inoperative position, as shown in full lines. At the end of the withdraw stroke of the apron, the solenoid coil So5 of valve V5, becomes de-energized, the valve V5 shifts under the action of its spring 370, and the air cylinders M3'' and M4'' operate to actuate the guides to their operative position, thereby pushing in on the cartons.

Figure 14:
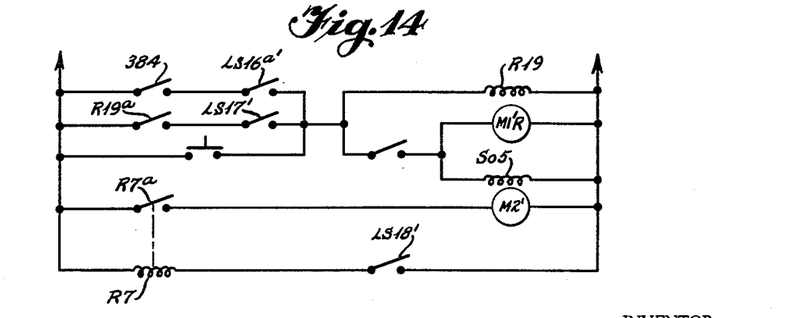
FIG. 14 is a schematic view illustrating portions of the electrical and pneumatic circuit utilized with the pallet loading machine disclosed in FIGS. 11 to 13.

Control of either of these modified constructions may be accomplished by the control system described earlier in this specification in conjunction with the preferred embodiment of the invention. An alternative control circuit, illustrated in FIG. 14, is applied to the operating devices of the apparatus shown in FIGS. 11–13. The closing-in guides remain engaged with the top layer of cartons on the pallet until the apron is retracted at which time they are withdrawn.

When a complete layer of articles has been placed upon the apron retraction of the apron is initiated by closure of a contact 384 as described in my copending application, Serial No. 469,274. This energizes apron retract "motor" M1'R through limit switch contacts LS16' which are closed when the apron is in its forward position, and also solenoid coil So5 and a relay R19 which closes locking-in contacts R19a' before limit switch contacts LS16' open upon retraction of the apron. Solenoid coil So5 shifts valve V5 to supply air to the air cylinders M3'' and M4'' to retract the closing-in guides 350, 352, 354 from the layer of articles already on the pallet.

Upon retraction of the apron, articles drop on to the pallet, and limit switch contacts LS18' of the full lift control are closed to energize a relay R7. Relay R7 closes contacts R7a to energize the pallet lowering "motor" M2' which continues until the articles reach the proper level at which time contacts LS18' open and lowering ceases.

Retraction of the apron to its full limit opens contacts LS17' in the locking-in circuit which holds relay R19, "motor" M1'R, and solenoid So5 energized. Upon de-energization of solenoid So5 spring 370 moves closing-in guide control valve V5 to direct air to the other ends of cylinders M3'' and M4'' to move the closing-in guides into engagement with the new layer of articles.

The embodiments illustrated are preferred forms of the invention. Many modifications of the invention defined in the appended claims will suggest themselves to those skilled in the art.

What is claimed is:

1. In a machine for assembling a plurality of layers of articles into a multi-layered stack of articles with each layer containing a plurality of articles arranged in a predetermined pattern, said machine comprising a frame defining a lift shaft, a lift movable vertically in said shaft, and an apron slidably mounted on said frame at the upper part of said shaft for movement between an extended article receiving position overlying the lift and a retracted position withdrawn from said shaft to deposit a layer of articles on the lift; the improvement comprising guides beneath the apron at contiguous sides of said shaft for defining the rectangular area of a layer of articles on the lift, means operated following the depositing of a layer of articles on the lift by withdrawal of said apron for moving said guides into the shaft to engage and align articles of a layer deposited on the lift, and means for lowering the lift to lower the layer of articles deposited from said apron and aligned by said guides to a position below the path of movement of said apron to permit said apron to return to said extended position to receive another layer of articles.

2. In an article stacking machine having a shaft with a lift movable vertically in said shaft and an apron slidably mounted at the upper part of the shaft for depositing successive layers of articles on the lift to form a stack of articles; apparatus for closing in and aligning articles in the uppermost layer deposited on said lift by said apron comprising retractable guides arranged at opposite sides of said shaft beneath said apron extendible into said shaft to define a rectangular area for a layer of articles, and means for extending said guides into the shaft to engage the sides of the last layer of articles deposited on the lift by the apron and close in and align the layer on the lift prior to the depositing of the next successive layer of articles.

3. In an article stacking machine having a frame defining a lift shaft with a lift movable vertically in said shaft and an apron slidably mounted on said frame at the upper part of the shaft for depositing a layer of articles on the lift; apparatus for closing in and aligning a layer of articles deposited by the apron on said lift comprising guides pivotally mounted at the front and opposite sides of said shaft beneath said apron for movement about horizontal axes to extended positions with said shaft and retracted positions withdrawn from the shaft, and means operable subsequent to the depositing of a layer of articles upon said lift by said apron for simultaneously moving each of said guides about its axis to engage the sides of articles in the last layer deposited by said apron and close in and align said articles into a layer on the lift prior to the depositing of another layer of articles upon the lift.

4. In an article stacking machine having a shaft with a lift movable vertically in said shaft and an apron slidably mounted at the upper part of the shaft for depositing a layer of articles on the lift; closing in and aligning apparatus comprising guides pivotally mounted at the sides of said shaft beneath said apron and power devices for simultaneously moving said guides into the shaft to define a compacted area for the layer of articles and engage and shift said articles into said area, said power devices then being withdrawn to retract said guides to permit lowering of the articles.

5. In an article stacking machine having means defining a lift shaft, a lift movable in said shaft, and means for depositing successive layers of articles upon said lift to assemble a stack of articles upon said lift; apparatus for compacting and aligning the sides of said stack of articles comprising guides pivotally mounted at the sides of said shaft and normally located in a position out of engagement with said articles, means for sensing the level of the uppermost layer of articles within said shaft, and means actuated by said sensing means, when said uppermost layer is located at a predetermined level in said shaft, for moving said guides into engagement with said layer of articles to compact said layer of articles and align said articles in the lift.

6. In an article stacking machine having means defining a lift shaft and lift means for supporting layers of articles at a predetermined level within said shaft; means operable to compact and align a layer of articles supported at said level comprising a first pair of guides mounted on opposing sides of said shaft, means linking said pair of guides for simultaneous movement toward and away from the center of said shaft, a third guide located at a side of said shaft intermediate the sides upon which said pair of guides are mounted, means for driving said first pair of guides toward the center of said shaft to compact and align the layer of articles, means for driving said third guide toward the center of said shaft to compact and align said layer of articles, and means for delaying the actuation of said third guide until said first pair of guides engage said layer of articles.

7. In an article stacking machine having means defining a lift shaft and lift means for supporting a layer of articles at a predetermined level within said shaft, means for depositing a layer of articles onto said supporting means, stationary means at one side of said shaft for aligning a first side of the layer, means mounted on opposing sides of said shaft and movable into engagement with the sides of said layer adjacent said first side of said layer, means mounted within said shaft and movable into engagement with the side of said layer opposite said first side of said layer, and means operable when said layer is at said predetermined level for simultaneously moving said opposed means into engagement with the layer of articles to compact and align the respective sides of the layer, and means for subsequently moving said third means into engagement with said layer of articles to complete the compacting and aligning of said layer of articles.

8. In an article stacking machine having means defining a lift shaft and lift means for supporting a layer of articles at a predetermined level within said shaft, and means for transferring successive layers of articles onto said supporting means to assemble said successive layers of articles into a stack, said transfer means being operable during the transferring operation to align a first side of the layer of articles, a first closing in guide assembly mounted within said shaft and movable into engagement with opposed sides of the layer of articles adjacent said first side, a second closing in guide assembly mounted within said shaft and movable into engagement with the remaining side of the layer of articles, means operable to move said first closing in guide assembly into engagement with said opposed sides of the layer of articles at said predetermined level within said shaft, and means for moving said second closing in guide assembly into engagement with said remaining side while the layer of articles is engaged by said first closing in guide assembly.

9. A pallet loading machine having means defining a lift shaft, a lift for raising and lowering a pallet in said lift shaft, and means for successively depositing layers of articles on said pallet to assemble a stack of articles on said pallet; means for compacting a layer of articles upon said pallet when said layer is located at a predetermined level within said lift shaft, and means for controlling the actuation of said compacting means comprising a spindle mounted at one side of said lift shaft at the upper end thereof, an arm mounted at one end on said spindle for pivotal movement about said spindle in a vertical plane, means for normally maintaining said arm in a rest position clear of said lift shaft, said last mentioned means being operable to release said arm to thereby allow said arm to pivot freely about said spindle downwardly into engagement with the upper surface of an article located upon said lift, a cam rotatable with said arm, and control means engageable by said cam at a predetermined rotative position of said arm upon said spindle, said control means being actuable by engagement of said cam therewith to operate said means for compacting articles.

10. An article stacking machine having a frame, a lift mounted for controlled raising and lowering movement within a lift shaft defined by said frame, movable article support means at the upper end of said lift shaft operable in a first position to support a layer of articles above said lift and operable upon movement from said first position to a second position to deposit said layer of articles upon said lift, a control system for operating said article support means and said lift to successively move said article support means from said first position to said second position to deposit a layer of articles supported thereon upon said lift, lower said lift to locate the deposited layer of articles at a selected level in said shaft, and return said article support means to said first position, said control system being operable in repeated cycles to deposit successive layers of articles in stacked relationship upon said lift, a pair of article engaging members extending across opposed sides of said lift shaft at said selected level, means supporting said members on said frame for movement toward and away from each other, means operable by said control system for driving said article engaging means toward each other to compact and align each layer of articles deposited on said lift prior to the depositing of the next successive layer of articles thereon, and means operable to retract said article engaging means from said lift shaft during movement of said article support means toward said second position.

11. An article stacking machine having a frame, a lift mounted for controlled raising and lowering movement in a lift shaft defined by said frame, an apron adapted to support a rectangular layer of articles, means mounting said apron upon said frame at the upper end of said shaft for movement between a first position wherein said apron overlies the upper end of said shaft and a second position wherein said apron is retracted clear of said shaft at one side thereof, drive means operable to drive said apron between said first and said second positions, a stripper bar extending across said one side of said shaft above said apron for stripping a layer of articles supported upon said apron during movement of said apron to said second position to deposit said layer of articles upon said lift, means responsive to the depositing of a layer of articles upon said lift for lowering said lift to locate the deposited layer of articles below the path of said apron, means responsive to the arrival of the deposited layer of articles at a location below the path of said apron for stopping said lift and actuating said drive means to return said apron to said first position whereby the stripping and lowering cycles may be repeated to assemble a stack of articles upon said lift, a pair of article engaging members extending across the opposed sides of said lift shaft adjacent said one side at a location below the path of said apron, means supporting said article engaging members upon said frame for movement toward and away from each other, and means for moving said article engaging members toward each other to compact and align the uppermost layer of articles supported upon said lift prior to the depositing of the next successive layer of articles thereon.

12. An article stacking machine comprising a frame defining a lift shaft, a lift movable vertically within said shaft, lift control means for vertically positioning said lift within said shaft, an apron slideably mounted on said frame at the upper end of said shaft for movement between an extended article receiving position overlying said lift and a retracted position withdrawn from said shaft, means operable during movement of said apron from said extended position to said retracted position for stripping articles from said apron to deposit the articles in a layer on said lift, guide means extending horizontally along the sides of said shaft at a location beneath the path of movement of said apron, and means cooperable with said lift control means for moving said guide means into said shaft against the adjacent sides of a layer of articles deposited upon said lift to compact and align the layer of articles prior to the depositing of a subsequent layer of articles upon said lift.

References Cited in the file of this patent

UNITED STATES PATENTS

| | | |
|---|---|---|
| 726,435 | Kaup | Apr. 28, 1903 |
| 785,520 | Reinecker | Mar. 21, 1905 |
| 1,851,972 | Blauvelt | Apr. 5, 1932 |
| 2,602,554 | Griffith | July 8, 1952 |
| 2,796,179 | VanVleck | June 18, 1957 |
| 2,818,156 | Edwards | Dec. 31, 1957 |